United States Patent [19]
Tracy

[11] Patent Number: 5,329,876
[45] Date of Patent: Jul. 19, 1994

[54] ANIMAL WATERER

[76] Inventor: Jere R. Tracy, 3060 N. Kiowa, Apt. B, Lake Havasu City, Ariz. 86403

[21] Appl. No.: 95,103

[22] Filed: Jul. 21, 1993

[51] Int. Cl.⁵ .............................................. A01K 5/00
[52] U.S. Cl. .................................................. 119/51.03
[58] Field of Search ............... 119/51.01, 51.03, 52.1, 119/51.5, 54, 56.1, 61, 74, 72, 77; 222/414, 410, 368, 377, 181, 185

[56] References Cited

U.S. PATENT DOCUMENTS

| | | |
|---|---|---|
| 65,004 | 5/1867 | Pope . |
| 911,674 | 2/1909 | Olsen ............................ 119/56.1 |
| 1,207,938 | 12/1916 | Kuxmann ....................... 119/56.1 |
| 2,158,093 | 5/1939 | Teske ............................ 119/51.03 |
| 2,158,094 | 5/1939 | Teske ............................ 119/51.03 |
| 3,459,159 | 8/1967 | Reed ............................ 119/51.03 |
| 3,734,060 | 5/1973 | Collison ........................ 119/51.03 |
| 3,901,191 | 8/1975 | Smith ........................... 119/51.03 |
| 4,184,450 | 1/1980 | Atchley et al. .................. 119/51.03 |
| 4,386,582 | 6/1983 | Adsit ............................ 119/51.03 |
| 4,947,796 | 8/1990 | Robinette ....................... 119/51.5 |
| 4,976,220 | 12/1990 | Gershman ....................... 119/52.1 |

*Primary Examiner*—Thomas Price
*Attorney, Agent, or Firm*—Lowell W. Gresham; Don J. Flickinger; Jordan M. Meschkow

[57] ABSTRACT

An animal watering apparatus (10) includes a dish (12) covered with a lid (20). The lid (20) includes an opening (22). A wheel (24) is rotatably mounted to the lid (20) in an upright orientation and extends above the lid (20) through the opening (22) and into the dish (12) to a position near the bottom surface (18) of the dish (12). The outer circumferential surface (40) of the wheel (24) is covered with projections or ridges (42) which efficiently bring water out of the dish (12) as the wheel (24) rotates as a result of being licked by the animal. A ridge opening (48) down a central region (50) of the outer circumferential surface (40) of the wheel (24) guides water back into the opening (22) where the water (21) falls into the dish (12).

13 Claims, 2 Drawing Sheets 5,329,876

ANIMAL WATERER

TECHNICAL FIELD OF THE INVENTION

The present invention relates generally to watering devices. More specifically, the present invention relates to animal waterers which enclose water in covered containers.

BACKGROUND OF THE INVENTION

An open container, such as a dish, bowl, bucket, tank, and the like, can serve as a simple and inexpensive animal watering device. While the simplicity and inexpensiveness are highly desirable features, open containers often pose problems to persons wishing to provide water for animals, such as pet dogs. An open water container promotes messes which may be particularly undesirable when they occur inside a house, and an open water container promotes water waste through contamination, dripping, evaporation, and the like.

When animals are particularly hot and thirsty, they may drink too much water too fast from an open container and get sick. Often times, animals like to put their feet, if not their entire bodies, in an open water container. This activity dirties the water from contaminants on the animal's feet, legs, and body. Then, after the animal withdraws from the open container it generally makes a mess as water drips or is shaken off the animal. Even if the animal does not step in its water, it often enjoys gulping water in a manner which leads to a mess from excessive drooling and water dripping off hair around the animal's mouth. Moreover, open water containers provide an opportunity for other animals to foul the water or other contaminants to be blown or otherwise fall into the water.

Feeding devices which are intended to dispense liquid feed or feed supplements from covered containers are known in the art. While such devices adequately attend to the needs of feed and supplement dispensing, they do not solve the problems associated with watering animals. For example, such devices typically dispense highly viscous liquid feeds or feed supplements in very limited quantities. The liquid feed or feed supplement is dispensed using a wheel with a smooth surface which rotates as an animal licks it. The wheel rotates down into a covered container where a small quantity of feed or feed supplement adheres to the wheel's surface. Continued rotation causes the wheel to elevate the small quantity of feed or feed supplement that adheres to the wheel's surface above the container's cover where it may be consumed by the animal.

Liquid feed and liquid feed supplement dispensers of this type fail to meet the needs of an animal waterer. Since water is a low viscosity liquid, only trace amounts of water can be elevated above a container's cover using these feeders. Consequently, an animal needing or wishing to get a drink must spend a considerable amount of time licking the wheel in order to obtain refreshment. Excessive licking of a wheel is highly undesirable. It is desirable to treat animals humanely, but allowing an animal to obtain only trace amounts of water with each lick induces frustration in the animal. In addition, excessive licking of a wheel generates excessive noise, which is a nuisance particularly when the watering device is located in a house. Moreover, excessive licking imposes excessive wear and tear on the moving parts of the feeder and limits the useful life of the feeder. Furthermore, the difficulty associated with obtaining refreshment as caused by allowing an animal to obtain only trace amounts of water with each lick encourages the animal to seek easier sources of water. When an animal is in a house, such other sources of water are often open toilets, which suffer from the drawbacks of open water containers plus an additional element of disgust on the part of human house occupants.

SUMMARY OF THE INVENTION

Accordingly, it is an advantage of the present invention that an improved animal watering apparatus is provided.

Another advantage of the present invention is that an animal watering apparatus is provided which prevents messy spillage of water.

Yet another advantage is that the present invention provides an animal watering apparatus which allows an amount of water to be dispensed which is sufficient to refresh the animal.

Another advantage of the present invention is that an animal watering apparatus is provided which is inexpensive to produce.

Another advantage of the present invention is that an animal watering apparatus is provided which prevents animals from drinking too much water.

These and other advantages of the present invention are carried out in one form by an animal watering apparatus consisting of a dish for holding water, a lid covering the dish and having an opening therein, and a wheel rotatably mounted to at least one of the dish and the lid. The wheel mounts in an upright orientation and has granular projections formed on the outer circumferential surface of the wheel for lifting some of the water from the dish as the wheel rotates.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
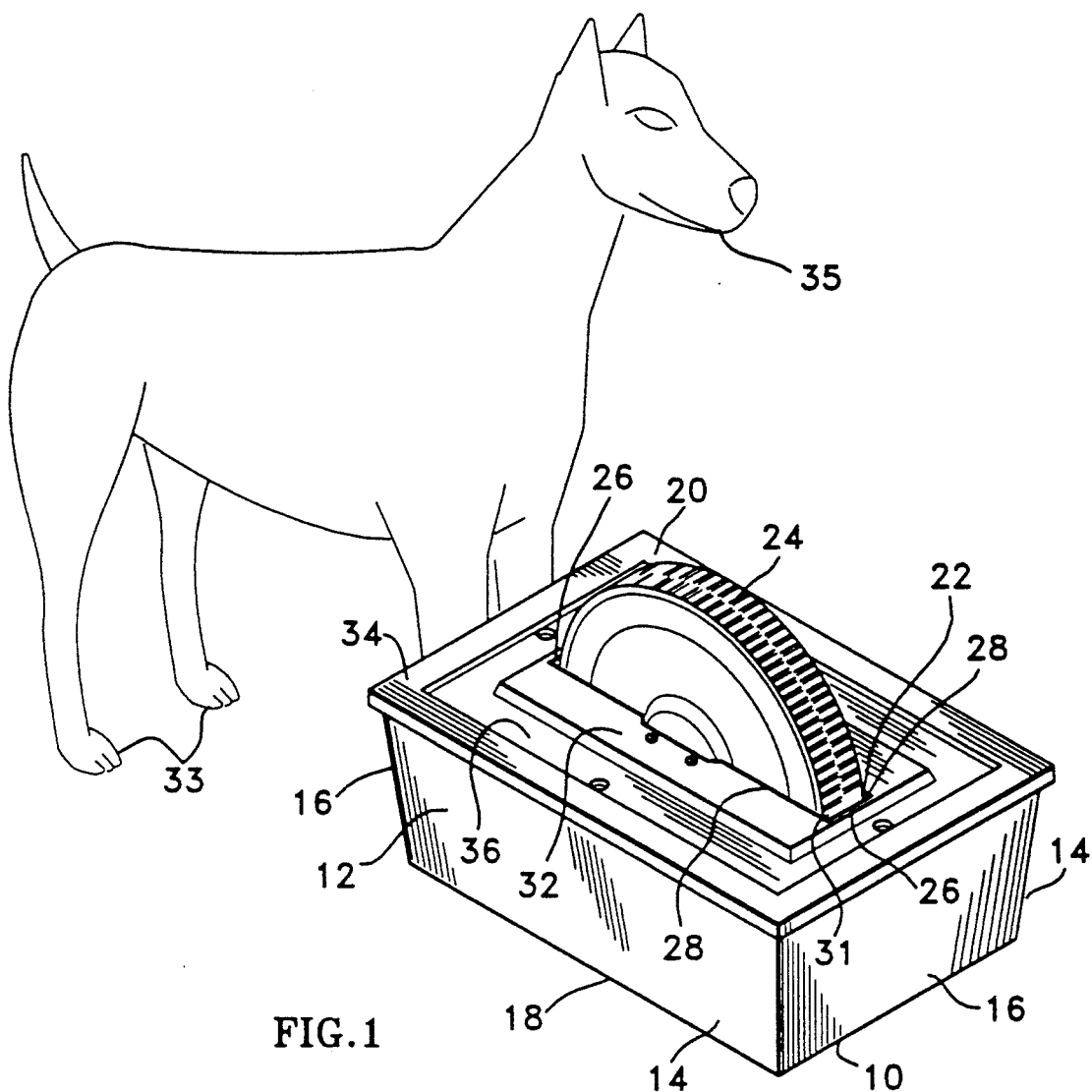
FIG. 1 shows a perspective view of an example embodiment of an animal waterer configured in accordance with the present invention.

FIG. 1 illustrates an animal waterer 10. Animal waterer 10 includes a dish 12 consisting of two side walls 14, two end walls 16 and a bottom surface 18. Walls 14 and 16 support a removable lid 20. Lid 20 may be removed from dish 12 to fill dish 12 with water 21, shown in FIGS. 2 and 3. An elongated opening 22 occurs in the mid-section of lid 20, parallel to side walls 14. A watering wheel 24 attaches to lid 20. Watering wheel 24 extends in an upright orientation so that it is approximately at a right angle with bottom surface 18. Wheel 24 resides in opening 22 such that a first portion of wheel 24 extends above lid 20 and a second larger portion of wheel 24 remains in dish 12. The diameter of wheel 24 is dimensioned so that the lowest portion of wheel 24 extends into dish 12 to a point near, but not touching, surface 18. An animal needing the nourishment of water 21 licks the portion of wheel 24 extending above lid 20. As the animal licks, wheel 24 turns bringing water 21 up from dish 12 by means of ridges discussed below in reference to FIG. 3.

Figure 2:
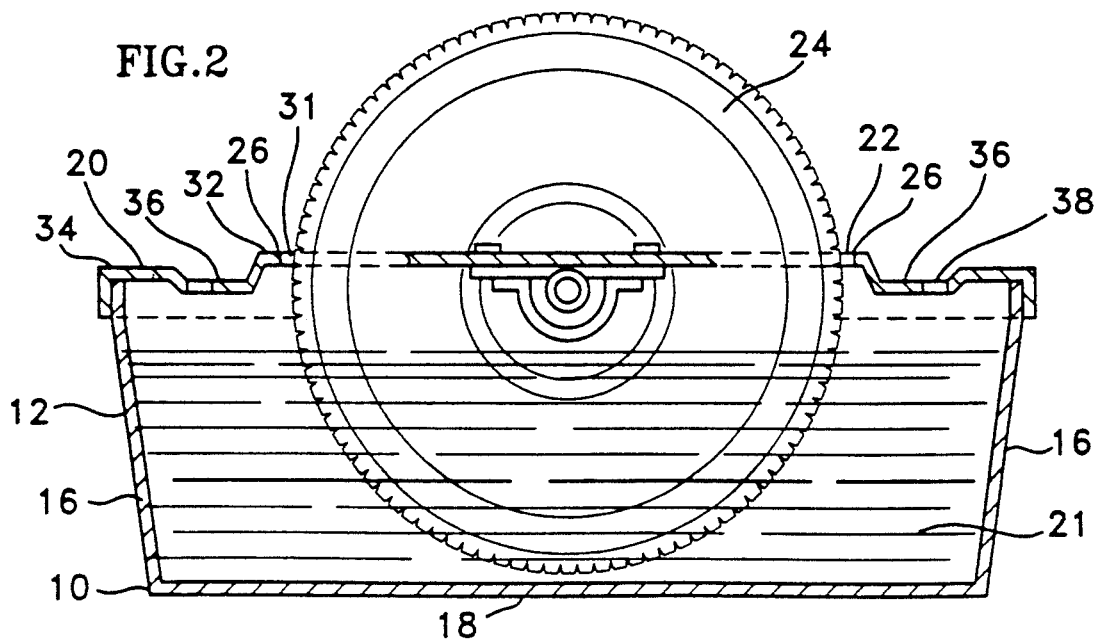
FIG. 2 shows a cross-sectional side view of the animal waterer.

With reference to FIGS. 1 and 2, opening 22 consists of two short sides 26 near end walls 16 of dish 12 and two longer sides 28 parallel to side walls 14 of dish 12. Wheel 24 is positioned in opening 22 by means of an axle 30 attached to lid 20. Axle 30 extends between opposing longer sides 28 of opening 22. Axle 30 extends in a generally horizontal orientation and is substantially parallel to bottom surface 18. Axle 30 extends through the center of wheel 24, and wheel 24 turns freely about axle 30. While the preferred embodiment mounts wheel 24 to lid 20 via axle 30, alternate embodiments may be devised which mount wheel 24 to bottom surface 18 or walls 14 and 16 of dish 12 through appropriate brackets.

Longer sides 28 of opening 22 are slightly larger than the diameter of wheel 24; likewise, short sides 26 of opening 22 are slightly longer than the width of wheel 24. Thus a small gap 31 is formed in opening 22 around wheel 24. However, gap 31 is sufficiently small to prevent pets from sticking their feet 33 or muzzles 35 through gap 31 into dish 12.

Lid 20 is formed to recapture any water 21 spilled or otherwise dripped onto the top of lid 20. Such spilled water 21 is thus prevented from draining onto the floor surrounding waterer 10, and water 21 is conserved so as to be available for future waterings. An upper interior area 32 of lid 20 resides immediately next to opening 22. Upper interior area 32 may be around the same height as an upper exterior area 34 of lid 20. A lower area 36 of lid 20 separates upper interior area 32 from upper exterior area 34. Water falling onto upper interior area 32 or upper exterior area 34 drains to lower area 36. Drain holes 38 reside in lower area 36. Water 21 in lower area 36 drains into dish 12 through holes 38. As with gap 31, each of holes 38 is desirably dimensioned sufficiently small to prevent pets from sticking their feet 33 or muzzles 35 through holes 38 into dish 12.

Figure 3:
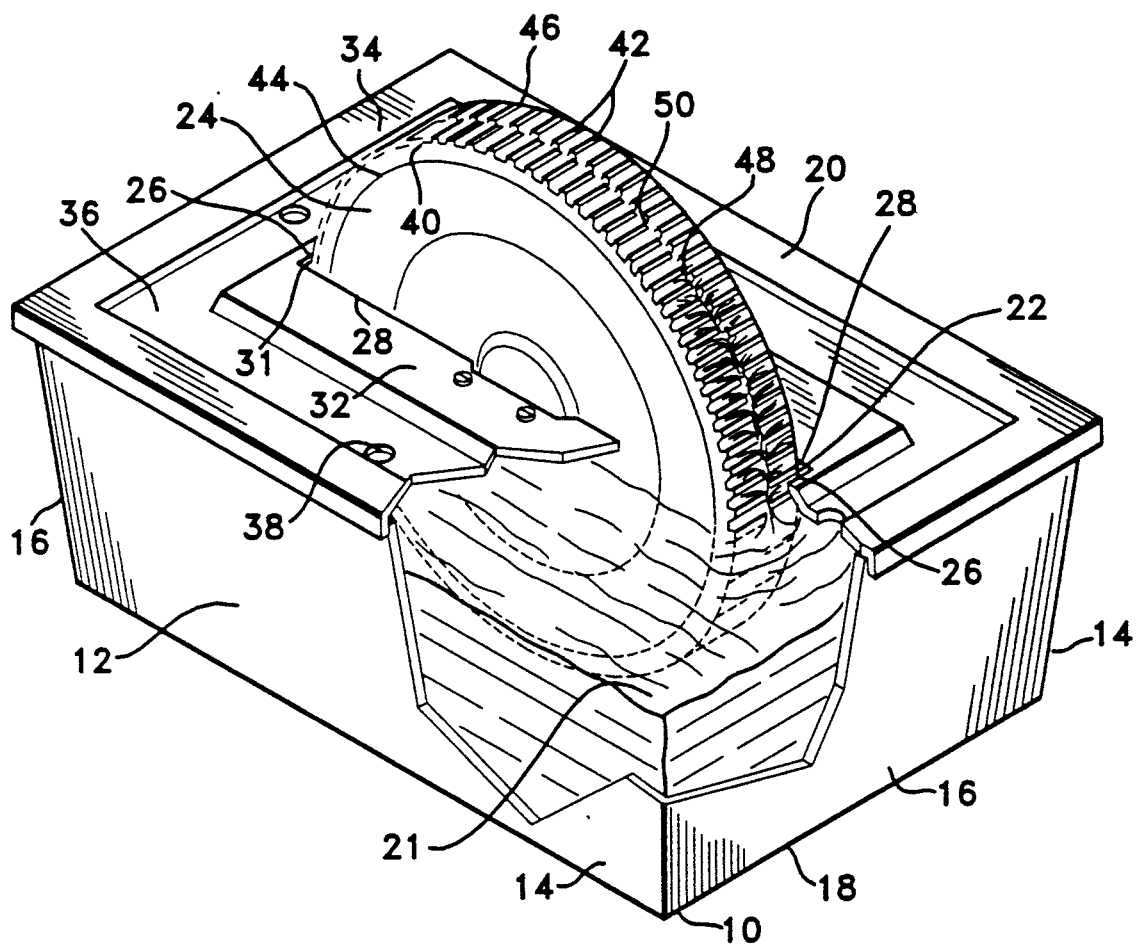
FIG. 3 shows a perspective view of the animal waterer with a cut-away portion illustrating the interior of the animal waterer.

With reference to FIG. 3, an outer circumferential surface 40 of wheel 24 is configured to lift some of water 21 from dish 12 as wheel 24 rotates. In one preferred embodiment, outer circumferential surface 40 has a multiplicity of granular projections in the form of spaced apart ridges 42. Desirably, the granular projections are integrally formed with wheel 24 as a unit, but this is not a requirement. Moreover, the granular projections and wheel 24 are both desirably made from a material which is substantially impervious to water, such as plastic. Since the granular projections and wheel 24 are substantially impervious to water, the useful life of waterer 10 is extended.

Ridges 42 extend radially outward from the surface of wheel 24 and also extend substantially horizontal and parallel with axle 30 (see FIG. 1). As wheel 24 rotates, a portion of water 21 is supported above each ridge 42 or other projection, and the projection prevents the water 21 from draining downward. Thus, ridges 42 help lift water out of dish 12 by supporting a portion of water in each ridge 42. Ridges 42 greatly improve the transmission of low viscosity liquids such as water to an animal licking wheel 24. Consequently, an animal may obtain sufficient nourishment from waterer 10 and need not be encouraged to seek out other, possibly more convenient, sources of water, such as an open toilet.

Wheel 24 has first and second opposing edges 44 and 46, respectively, extending in a generally upright plane. Ridges 42 extend substantially across the outer circumferential surface 40 of wheel 24 between first edge 44 and second edge 46, except for a ridge opening 48 in a central region 50 of wheel 24 between first and second edges 44 and 46. Ridge opening 48 permits a small quantity of water 21 to fall as wheel 24 rotates. By capillary action, this small quantity of falling water 21 tends to draw water 21 away from first and second edges 44 and 46 toward central region 50 of wheel 24. By drawing water 21 away from edges 44 and 46, a neat watering apparatus results. Less splashing and spilling result than might occur if water tended to fall down edges 44 and 46. Water falling down ridge opening 48 drains back into dish 12 through opening 22, thus preventing spills and wasted water.

In summary the present invention provides an animal waterer which prevents messy spills, yet allows animals to easily get enough water to refresh themselves. Animals can lick a wheel which efficiently brings sufficient water up out of a dish to refresh the animals. The outer circumferential surface of the wheel is covered with granular projections, such as ridges, which aid in bringing the water up out of a water dish. A ridge opening down the center of the outer surface of the wheel guides excess water back into the water dish. A lid prevents the animal from accidentally sticking feet or muzzle into the water reservoir, thereby discouraging the animal from consuming too much water and discouraging water spills. The closed lid design also prevents the water from being contaminated or entered by other animals. The waterer provides a simple, inexpensive solution for pet owners desiring to give sufficient water to their pet while keeping the floor around the waterer virtually free of water spills.

The present invention has been described above with reference to a preferred embodiment. However, those skilled in the art will recognize that changes and modifications may be made in this preferred embodiment without departing from the scope of the present invention. For example, the dimensions of the wheel, dish, and lid could easily be adjusted to suit different sizes of pets. Likewise, the ridges on the outer surface of the wheel could be expanded or reduced in size in order to adjust the amount of water provided for a pet. Moreover, while the presently preferred embodiment of the present invention uses generally horizontally extending ridges, many other styles of granularities would acceptably function to lift water from the dish. These and other changes and modifications which are obvious to those skilled in the art are intended to be included within the scope of the present invention.

What is claimed is:

1. An animal watering apparatus which reduces spillage and mess while providing adequate water availability, said apparatus comprising:
   a dish for holding a quantity of water;
   a lid covering said dish and having an opening therein;
   a wheel rotatably mounted to at least one of said dish and said lid in an upright orientation so that a portion of said wheel extends through said opening in said lid, said wheel having first and second opposing edges which extend in generally upright planes; and
   means, applied to an outer circumferential surface of said wheel and projecting outward from said wheel, for lifting a portion of said water from said dish as said wheel rotates, said lifting means comprising a multiplicity of spaced apart ridges formed in said outer circumferential surface of said wheel and projecting radially outward from said wheel, said ridges extending substantially across said outer circumferential surface of said wheel between said first and second edges, a ridge opening is provided in a central region between said first and second edges, said ridge opening permitting a small quantity of water to fall as said wheel rotates to draw water away from said first and second edges toward said central region.

2. An animal watering apparatus as claimed in claim 1 wherein said ridges are integrally formed with said wheel as a unit.

3. An animal watering apparatus as claimed in claim 1 wherein:
said wheel rotates around an axle retained in a substantially horizontal orientation; and
said ridges extend in a direction generally parallel with said axle.

4. An animal watering apparatus as claimed in claim 1 wherein said wheel and said lifting means are formed from a material which is substantially impervious to water.

5. An animal watering apparatus as claimed in claim 1 wherein:
said dish has a bottom surface and upright walls;
said lid attaches to said upright walls; and
said wheel mounts to said lid and extends into said dish to a position proximate said bottom surface of said dish.

6. An animal watering apparatus which reduces spillage and mess while providing adequate water availability, said apparatus comprising:
a dish having a bottom surface and upright walls and being configured to hold a quantity of water;
a lid releasably attached to said upright walls to cover said dish, said lid having first and second openings therein, and said lid having a low area on a top surface thereof, said first opening residing in said low area so that said low area and said first opening operate to allow water falling upon said top surface to drain into said dish; and
a wheel rotatably mounted to at least one of said dish and said lid in an upright orientation so that a portion of said wheel extends through said second opening in said lid and into said dish to a position proximate said bottom surface, said wheel having a multiplicity of spaced apart ridges formed in an outer circumferential surface of said wheel and projecting radially outward from said wheel, said ridges serving to lift a portion of said water from said dish as said wheel rotates.

7. An animal watering apparatus as claimed in claim 6 wherein:
said wheel rotates around an axle retained in a substantially horizontal orientation; and
said ridges extend in a direction generally parallel with said axle.

8. An animal watering apparatus as claimed in claim 7 wherein:
said wheel has first and second opposing edges which extend in generally upright planes; and
said ridges extend substantially across said outer circumferential surface of said wheel between said first and second edges except for a ridge opening in a central region between said first and second edges, said ridge opening permitting a small quantity of water to fall as said wheel rotates to draw water away from said first and second edges toward said central region.

9. An animal watering apparatus as claimed in claim 6 wherein said wheel is formed from a material which is substantially impervious to water.

10. An animal watering apparatus as claimed in claim 6 wherein:
said apparatus is used by an animal having a muzzle and a foot;
said second opening is larger than said wheel to permit said wheel to freely rotate within said second opening and so that a gap forms in said second opening around said wheel; and
said first opening and said gap are each dimensioned sufficiently small to prevent said muzzle or said foot from fitting therein.

11. An animal watering apparatus which reduces spillage and mess while providing adequate water availability, said apparatus comprising:
a dish for holding a quantity of water;
a lid covering said dish and having a first opening therein, a top surface in which a first area thereof is lower than other areas, and a second opening therein located in said first area to permit water falling upon said top surface to drain into said dish;
a wheel rotatably mounted to at least one of said dish and said lid in an upright orientation so that a portion of said wheel extends through said first opening in said lid; and
means, applied to an outer circumferential surface of said wheel and projecting outward from said wheel, for lifting a portion of said water from said dish as said wheel rotates.

12. An animal watering apparatus as claimed in claim 11 wherein:
said apparatus is used by an animal having a muzzle and a foot;
said first opening is larger than said wheel to permit said wheel to freely rotate within said first opening and so that a gap forms in said first opening around said wheel; and
said second opening and said gap are each dimensioned sufficiently small to prevent said muzzle or said foot from fitting therein.

13. An animal watering apparatus as claimed in claim 11 wherein said lifting means comprises a multiplicity of granular projections residing on said outer circumferential surface of said wheel.

* * * * *